April 10, 1962 E. G. GLICK 3,028,939
AUTOMOBILE ACCELERATOR CONTROL WITH PRESET
AUTOMATIC THROTTLE OPERATION
Filed April 21, 1958 8 Sheets-Sheet 1

Inventor:
Edward G. Glick
By: Schroeder, Hofgren,
Brady & Wegner
Attorneys

E. G. GLICK

3,028,939

AUTOMOBILE ACCELERATOR CONTROL WITH PRESET
AUTOMATIC THROTTLE OPERATION

Filed April 21, 1958

Inventor:
Edward G. Glick
By: Schroeder, Hofgren,
Brady & Wegner
Attorneys

United States Patent Office 3,028,939
Patented Apr. 10, 1962

3,028,939
AUTOMOBILE ACCELERATOR CONTROL WITH PRESET AUTOMATIC THROTTLE OPERATION
Edward G. Glick, 5496 Hyde Park Blvd., Chicago, Ill., assignor of one-half to Rembe McCormick, Chicago, Ill.
Filed Apr. 21, 1958, Ser. No. 729,919
15 Claims. (Cl. 192—3)

This invention relates to speed control means and in particular to means for controlling an automobile accelerator to provide pre-set automatic throttle operation.

The invention comprehends a further improvement in the accelerator control mechanism disclosed in my prior Patents 2,270,002 and 2,822,902. These prior patents disclose an accelerator control mechanism which, when activated by the operator of the automobile, retains the accelerator in a fixed position so that the automobile will maintain a desired speed in level travel although the operator removes his foot from the accelerator pedal. The operator may instantly regain pedal control of the automobile merely by depressing the accelerator pedal, the brake pedal, or a manual release push button, any one of which deactivates the control mechanism.

The present invention discloses an accelerator control including means by which the operator may select a speed to which the mechanism will automatically accelerate or decelerate the automobile, and then maintain that speed in spite of limited changes in road gradient. The present mechanism, like the earlier ones, also permits the operator to regain pedal control of the automobile by depressing the accelerator pedal, the brake pedal or a push button. The present control, in addition, permits the operator to adjust the speed of the automobile to any point between zero and a maximum without directly operating the accelerator pedal.

The principal object of the present invention, therefore, is to provide a new and improved control mechanism effecting automatic speed regulation of a variable speed device. An automobile is a typical variable speed device to which the control mechanism is applicable; and the invention will be described solely with reference to an automobile.

Another object of the invention is to provide a control mechanism permitting the operator of an automobile to select an operating speed to which the mechanism automatically accelerates to decelerates the automobile, and at which it maintains the automobile until the operator resumes conventional control.

A further object is to provide a control mechanism with which the operator selects the desired operating speed by moving a manual control knob to set a mechanism which is operably associated with the speedometer.

Still another object is to provide an automobile accelerator control having a control knob to adjust means associated with the speedometer and, thus, effect speed regulating control of the accelerator.

A further object is to provide a control mechanism which has photoelectric means responsive to the arrangement of the speedometer corresponding to the speed of the automobile so as to provide the desired speed control.

A still further object is to provide a control mechanism including means for inactivating the control during such time as when the speed of the automobile is the desired speed as set by the control knob.

A still further object is to provide a control mechanism including means automotically inactivating the control whenever the accelerator pedal reaches the limit of its travel in either direction.

Other features and advantages of this invention will be apparent from the following description taken in connection with the accompanying drawings, wherein.

Figures 17, 18, 19:
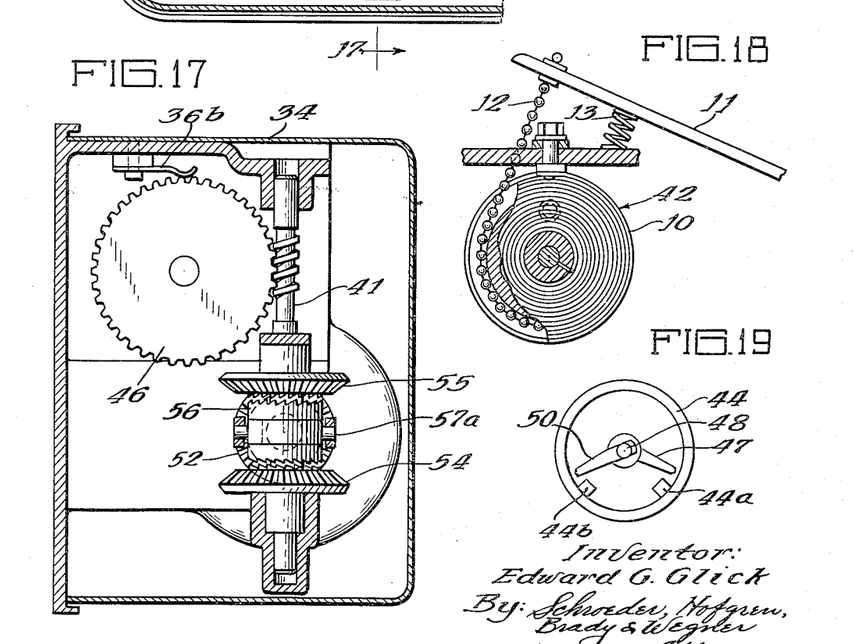
FIG. 17 is a vertical section taken as indicated along the line 17—17 of FIG. 16.
FIG. 18 is a view on reduced scale showing the accelerator control means partially broken away and in section, and the connection of the accelerator pedal thereto.
FIG. 19 is an elevation of the means for inactivating the control mechanism when the accelerator pedal reaches the limit of its travel in either direction.

In the exemplary embodiment of the invention as disclosed in the drawings, an improved automobile accelerator control (FIG. 18) comprises an accelerator holding device, generally designated 10, retaining the accelerator pedal 11 of an automobile in a desired position by means of a connecting chain 12 acting in opposition to the normally provided accelerator spring 13 which urges the accelerator pedal to the idling position. Holding device 10 is generally similar to the holding device disclosed in Patent 2,822,902, to which patent reference may be had for a detailed description of the holding device structure. Herein, however, as seen in FIG. 20A, a drive means generally designated 14 is associated with the holding coil 15 of the holding device to cause chain 12 selectively to be pulled downwardly, retained in a desired position, or released to be drawn upwardly by the action of accelerator pedal spring 13, thereby increasing, maintaining, or decreasing the speed of the automobile relative to a previous setting of the accelerator pedal. In addition, holding device 10 is provided with means, generally designated 16, inactivating the control mechanism whenever the pedal 11 reaches the extreme of its movement in either direction. Thus, means 16 precludes the control mechanism from attempting to control the speed of the automobile beyond the maximum possible range. The specific structures of drive means 14 and limiting means 16 will be described subsequently.

As discussed briefly above, drive means 14 operates holding device 10 to adjust the setting of accelerator pedal 11 whereby the speed of the automobile is controlled as desired by the operator. The instant invention is concerned primarily with the means for controlling drive means 14 to effect this desired operation. The operator may place the automobile under the control of the automatic mechanism, remove it from such control, and adjust the speed at which he wishes the automobile to operate while automatically controlled, all from a manual operating station 17 (FIG. 1) provided with an "On" push button 18, an "Off" push button 18a, an "Automatic" push button 19, and a speed control knob 20. Depression of the "On" push button 18 places the control in readiness for operation. Subsequent depression of "Automatic" push button 19 actuates the control causing device 10 to operate accelerator pedal 11 in accordance with the desired speed information put into the control system by means of knob 20. Depression of the "Off" button 18a releases the accelerator pedal 11 from control by the holding device so that the pedal may be controlled in the normal manner by the operator's foot. (Depression of the brake pedal, depression of the accelerator pedal by the operator, or turning off of the ignition of the automobile also releases the automatic control, as discussed subsequently.) Operating station 17 is mounted on a portion of the dashboard 21 of the automobile adjacent the speedometer 22 thereof, conveniently adjacent the steering wheel 23 for reading and instant use by the operator.

Figures 1, 2, 3, 4:
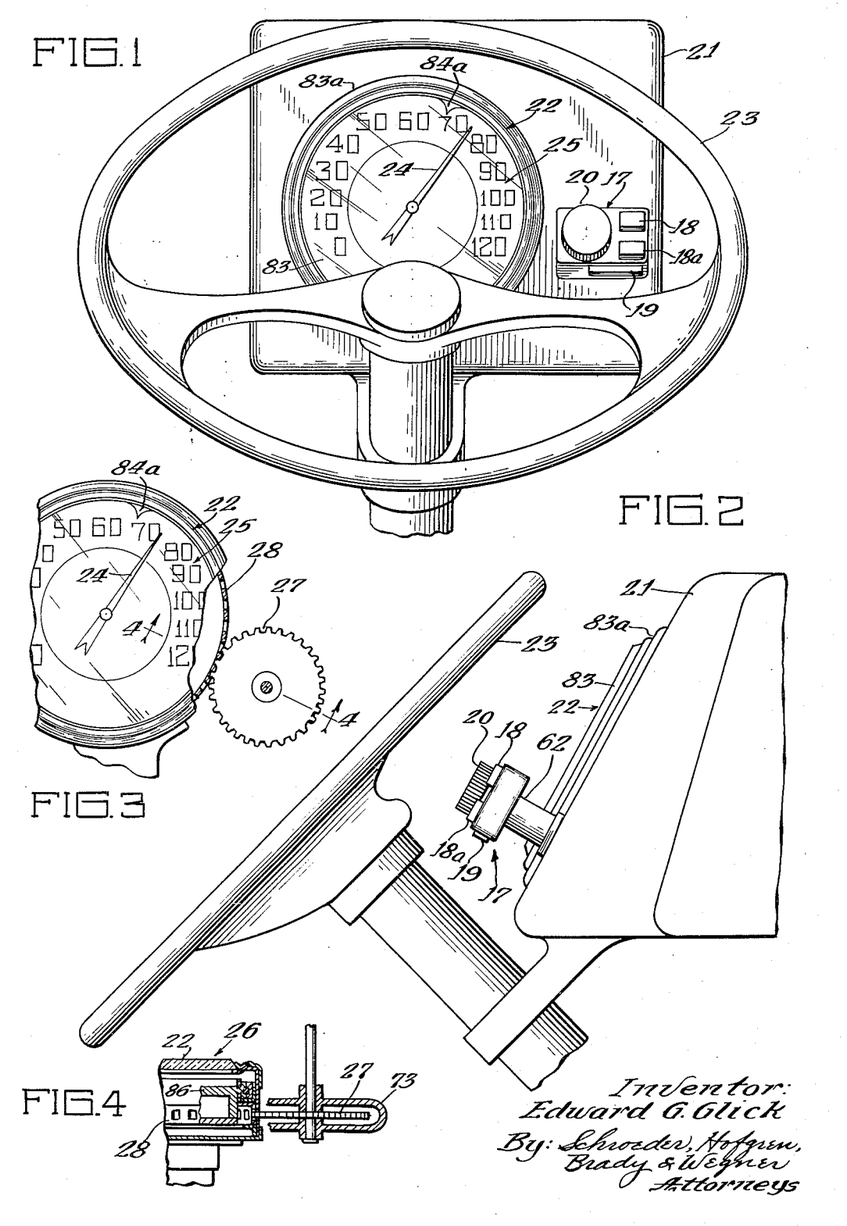
FIG. 1 is a front elevational view of the manual control means of a control mechanism embodying the invention installed in an automobile adjacent the speedometer thereof, the steering wheel means of the automobile being shown fragmentarily.
FIG. 2 is a fragmentary side elevation thereof.
FIG. 3 is a fragmentary front elevation of the speedometer with portions thereof broken away, showing the operating connection between the control knob and the control means associated with the speedometer.
FIG. 4 is a fragmentary transverse section taken as indicated along the line 4—4 of FIG. 3.

Speedometer 22 (FIG. 1) includes conventional speed indicating means such as needle 24 and indicating faceplate 25 provided with a speed scale 25a. Operably associated with the speedometer is a sensing and registering means, generally designated 26 (FIG. 5), which senses a difference between the actual speed of the automobile and the speed at which the operator desires to operate the automobile, which latter information is fed to means 26 through suitable manipulation of knob 20 through an interconnecting sprocket 27 and rack 28 (FIG. 4).

As indicated above, a difference between the actual and desired speed of the automobile is sensed by means 26. An electrical signal is produced thereby which is delivered through an electrical control generally designated 29 (FIGS. 20 and 20A) effecting the necessary operation of drive 14 to change the position of accelerator pedal 11 correspondingly and bringing the automobile to the desired speed of operation. The specific structure of control 29 will be set forth in detail subsequently. Briefly, however, control 29 comprises a pair of opposed solenoids 30 and 31 selectively operating a reversing clutch 32 connecting drive 14 to a constantly rotating motor 33. The clutch is biased to a neutral position when neither of the solenoids is actuated, which condition arises when the speed of the automobile is exactly equal to the desired speed set by the operator; thus, at that time, holding device 10 merely retains the accelerator pedal 11 in the desired position. Should the speed of the automobile vary from the desired speed, however, one or the other of the solenoids 30 and 31 is energized in response to that variation as sensed by means 26, and drive 14 is operated to effect, through holding device 10, the necessary correction of the accelerator pedal position.

A broad description of my improved accelerator control means having been given, we will now consider the individual elements in greater detail.

THE HOLDING DEVICE

As best seen in FIGS. 16 through 19 and 20A, holding device 10 comprises a housing 34 in which is received the holding coil 15 comprising an electromagnet energized through suitable sliding contacts 35a and 35b from a pair of fixed contacts 36a and 36b carried on an insulating plate 37 extending across an opening 38 in the housing. Coil 15 is mounted on a shaft 39 on one end of which is fixed a worm wheel 40 driven by a co-operating worm shaft 41, which worm wheel and shaft comprise the drive means 14. Mounted on the other end of shaft 39 is means, generally designated 42, for controlling the arrangement of chain 12 as a function of the amount of rotation of coil 15. Holding device 10 is similar to the holding device disclosed in my Patent 2,822,902 except that no neutralizing coil is provided and means are associated therewith for limiting the action of the holding device 10 at the extreme movements of accelerator pedal 11. The limiting means includes a sleeve 42a provided at its outer end with a disc-shaped flange 43. Flange 43 is formed of an insulating material which is peripherally provided with an L-section annular conductor ring 44 having a pair of radially inwardly extending, spaced projections 44a and 44b (FIG. 19). Extending through the end of housing 34 is a sleeve 45 on the outer end of which is a handwheel 46 and on the inner end of which is a contact arm 47 adjustably positionable relative to projection 44a by manipulation of the handwheel. Extending through sleeve 45 is a shaft 48 on the outer end of which is a handwheel 49 and on the inner end of which is a contact arm 50 adjustably positionable relative to projection 44b by manipulation of handle 49. A grounded brush 51 extends through housing 34 to ground ring 44 at all times.

As indicated briefly above, drive 14 is operated to drive shaft 39 alternatively in opposite directions by means of reversing clutch 32 associated with the drive motor 33. Clutch 32 (FIGS. 16 and 17) comprises a first bevel gear 52 secured to the outer end of motor shaft 53 and a pair of opposed bevel gears 54 and 55 driven by gear 52. A clutch block 56 is axially slidably but nonrotatively mounted on the end of worm shaft 41 to have engagement alternatively with either gear 54 or gear 55. The movement of clutch block 56 axially of shaft 53 is effected by a crank arm 57 pivoted on a shaft 58 by means of a plunger 59 associated with each of solenoids 30 and 31. Crank arm 57 is connected to clutch block 56 by means of a sliding collar 57a which permits ready rotative and nonaxial movement between the crank arm and the clutch block. A spring 60 is connected to crank arm 57 to center clutch block 56 between drive gears 54 and 55 when neither of the solenoids 30 or 31 is energized.

THE MANUAL OPERATING MEANS

By effecting an alternative forward and reverse opera- of drive 14, holding device 10 effects a change in the posi- tion of accelerator pedal 11 correspondingly increasing or or decreasing the speed of the automobile. Thus, one method of operating the holding device to effect the de- sired speed would be to have the operator effect an ener- gization of the proper solenoid, depending on whether an increase or decrease in speed was desired, until the desired speed was reached. This could be done, for ex- ample, by a pair of push buttons connecting the solenoids to a suitable power supply. However, this arrangement would have the defect that it would not be automatic and that a constant manual operation of the push button would be required similar to the conventional operation of the foot pedal accelerator control. The instant inven- tion comprehends automatic means for controlling sole- noids 30 and 31 to bring the speed of the automobile to a selected speed and maintain the speed as desired by the operator. As indicated above, the control means includes a manual operating station in which is provided a speed setting control knob 20 for adjustment by the operator to select the speed at which he wishes the automobile to be automatically operated. Knob 20 (FIG. 6) is connected to a drive shaft 61 on which is carried the sprocket 27 by means of a connector 62 having a radially enlarged upper end defining a split ring 63. Within the split ring is arranged an arm 64 having a radially outwardly ex- tending projection 65 biased to a position between the two split portions of the ring 63 by a spring 66 extending between the arm 64 and an insulating ring 67 surround- ing the arm inwardly of the split ring. Shaft 61 is secured to connector 62 by means of a set screw 61a engaging the end of the shaft in a recess 62a in the inner end of the connector. Electrical connection to arm 64 is made through a brush 68 engaging a projecting portion 69 of the knob to which arm 64 is connected, the brush being held in slidable contact with portion 69 by means of a spring 70 in electrical contact with a terminal 71. Whenever knob 20 is manipulated by the operator, arm 64 completes a ground connection to split ring 63 which is grounded through a tubular support 72 mounting the manual operating station 17 on the front of the dash- board portion 21. Shaft 61 extends through support 72 to behind the dashboard where the outboard end is jour- nalled in a housing member 73 surrounding the sprocket 27 which is secured to the end of the shaft.

THE SENSING AND REGISTERING MEANS

Figures 5, 6, 7:
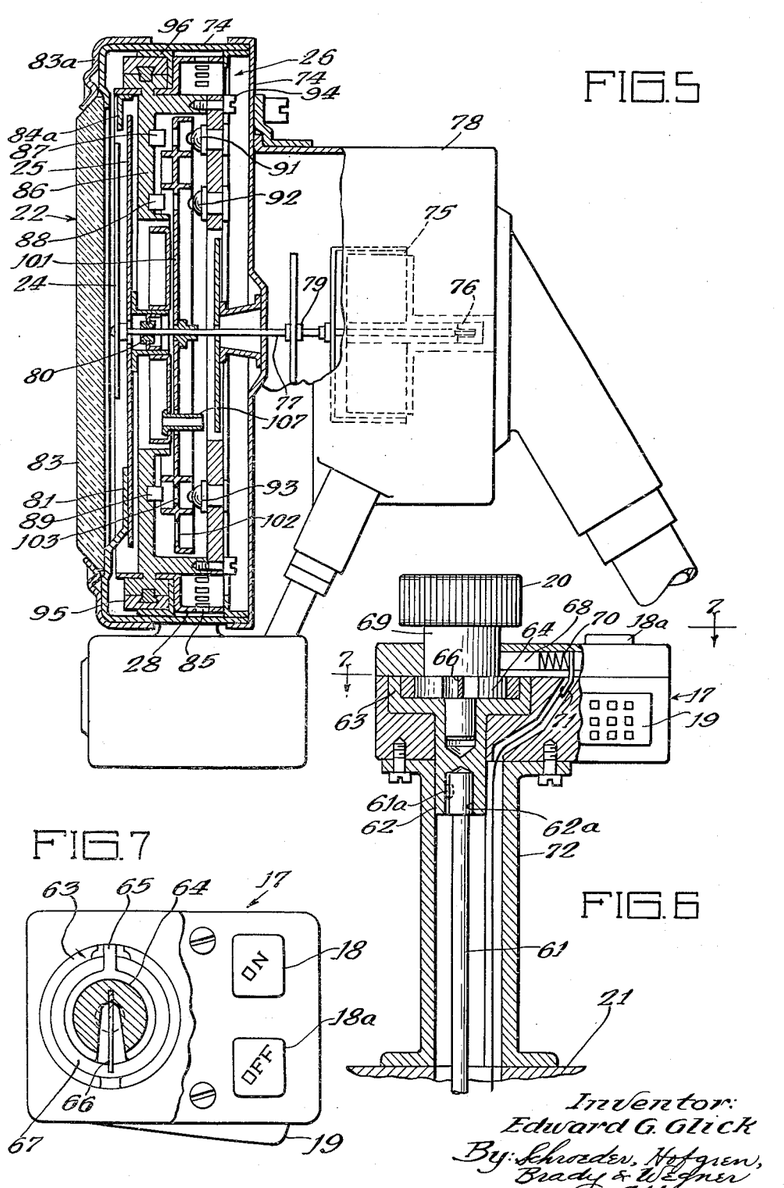
FIG. 5 is a fragmentary side elevation partially broken away and in section, of the speedometer means and associated control mechanism.
FIG. 6 is a fragmentary, bottom view partially broken away and in section, of the manual control means.
FIG. 7 is a front elevation thereof with a portion broken away to show the connector rings associated with the knob.
Figures 8, 9:
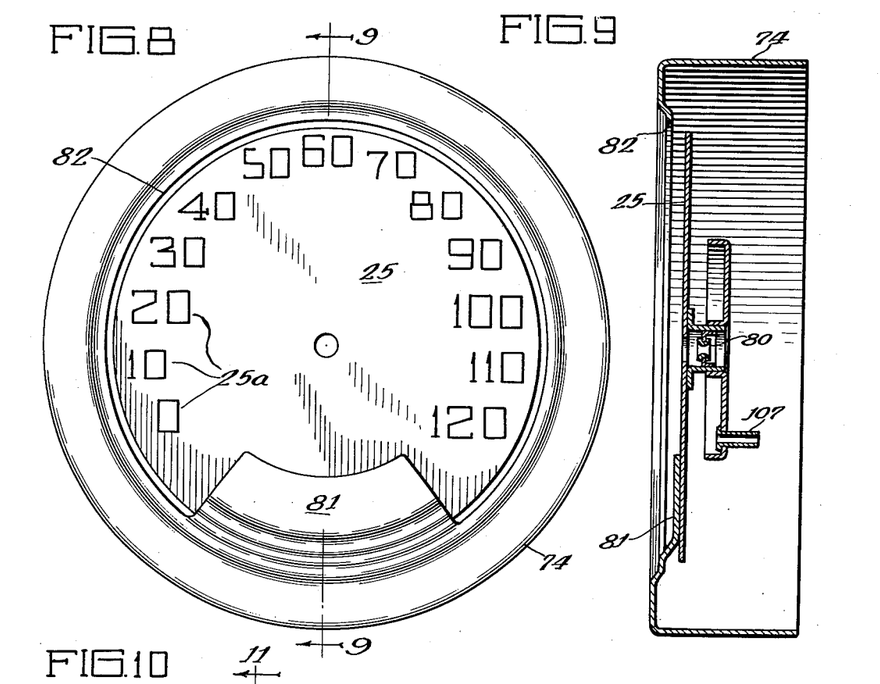
FIG. 8 is a front elevation of the speedometer housing and faceplate.
FIG. 9 is a vertical section taken as indicated along the line 9—9 of FIG. 8.

The sensing and registering means 26 is associated with the speedometer 22 of the automobile and receives information via the rotational input from sprocket 27 to provide automatically suitable information to the control circuit 29 to effect the desired automatic operation of solenoids 30 and 31. Sensing is effected in means 26 by photoelectric means, thereby eliminating inertia and con- tact problems such as would arise with the use of devices such as microswitches and the like. To illustrate the structure of the means 26 most clearly, a section of the complete assembly is shown in FIG. 5 and individual ele- ments thereof are shown in FIGS. 8 through 15. Thus, as seen in FIG. 5, the sensing and registering means is installed in the housing 74 of the speedometer 22, behind the indicator plate 25 therof. The means 75 for connect- ing speedometer cable end 76 to a shaft 77 on which the indicator needle is mounted is disposed in an enclosure 78 mounted on the rear portion of housing 73. Shaft 77 is supported in an inboard bearing 79 within enclosure 78 and an outboard bearing 80 behind indicating plate 25 (FIG. 9). Indicating plate 25 is secured by means of a flange 81 to extend slightly behind the front opening 82 of the speedometer housing through which the major portion of the indicator plate is viewable. A transparent plate 83 may be secured across opening 82 by means of suitable clips 83a to close the front of the housing.

Figures 12, 13:
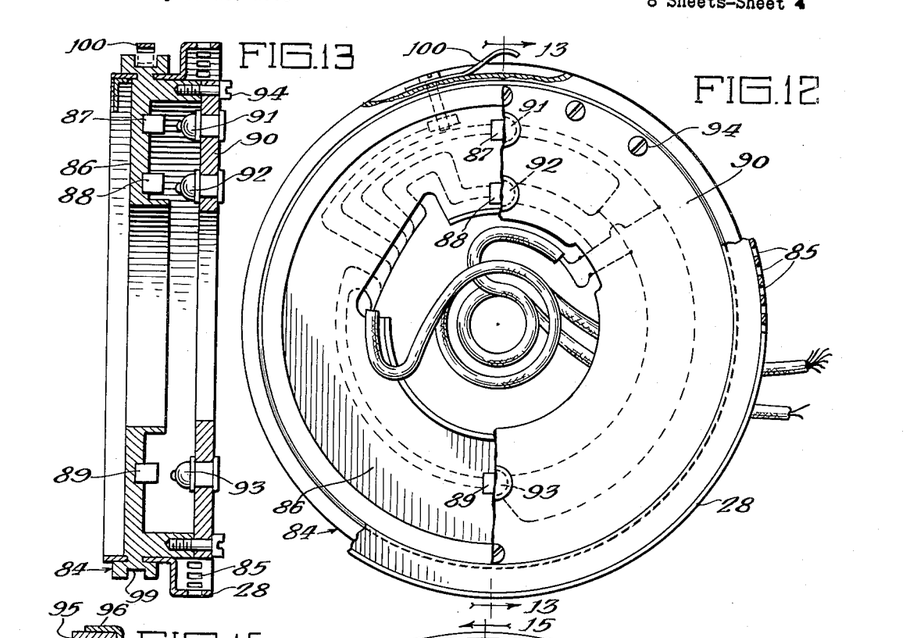
FIG. 12 is a front elevation with portions broken away, away, of the adjustable control means associated with the speedometer.
FIG. 13 is a vertical section taken as indicated along line 13—13 of FIG. 12.
Figures 14, 15:
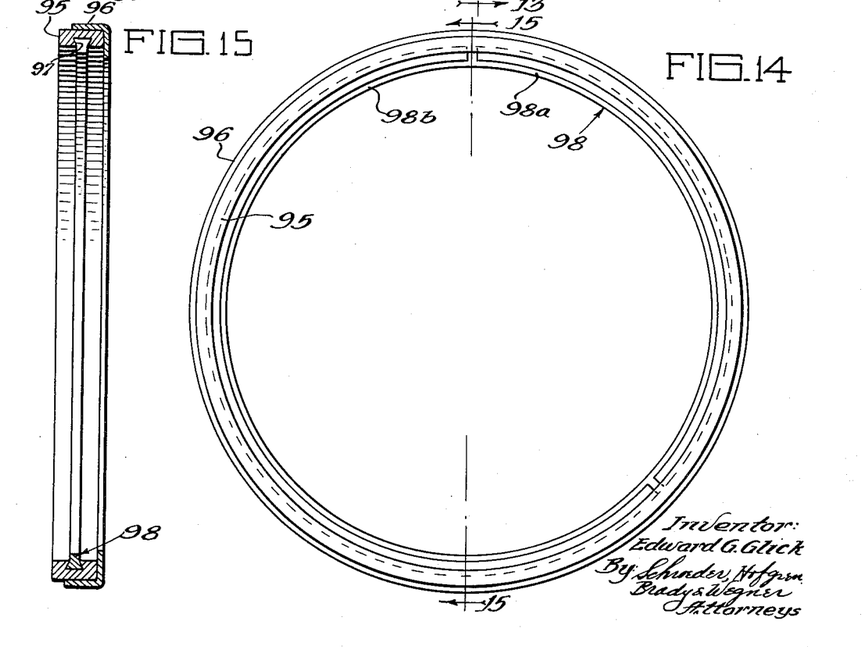
FIG. 14 is a front elevation of the slide ring means for varying the operation of the adjustable control means.
FIG. 15 is a vertical elevation taken as indicated along the line 15—15 of FIG. 14.
Figure 16:
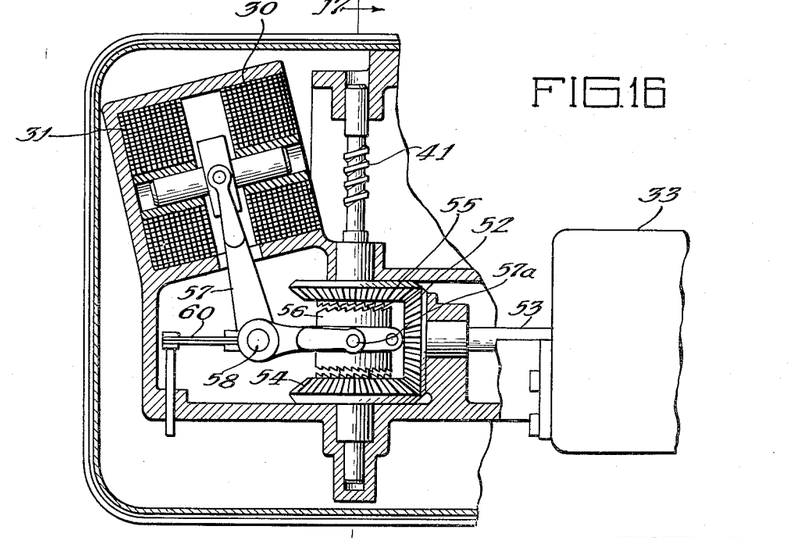
FIG. 16 is a fragmentary vertical section of the drive means of the accelerator control, the drive motor therefor being shown in fragmentary elevation.

In FIGS. 12 and 13 is shown the revolving frame 84 which is rotated concentrically about the axis of indicator shaft 77 by the annular rack 28 driven by sprocket 27 associated with the manual operating means. Rack 28 is integral with frame 84 and comprises an annular mem- ber having a plurality of apertures 85 for driving co- operation with the toothed sprocket 27. At its forward end, frame 84 is provided with an indicator 84a which extends to adjacent scale 25a to indicate the speed se- lected by the operator. A radially inwardly extending annular flange 86 on frame 84 carries three photoelectric cells 87, 88 and 89, respectively. Secured to the rear- ward portion of the frame 84 is an annular mounting plate 90 on which are mounted three lamps 91, 92 and 93 aligned with photocells 87, 88 and 89, respectively. Plate 90 is secured to the frame 84 by suitable means such as screws 94. Frame 84 is journalled for rotation about the axis of shaft 77 by means of a slide ring 95 (FIGS. 14 and 15) circumferentially secured to housing 74 by an annular L-section support 96. Slide ring 95 is formed of an insulating material and is provided with a radially inwardly opening annular groove 97 in which is received a split electrical contact ring 98. As best seen in FIG. 4, contact ring 98 comprises a first segment 98a extending somewhat less than 180 degrees and a second segment 98b extending complementarily to the first por- tion and insulatingly spaced therefrom. Frame 84 is provided with an annular, outwardly opening recess 99 into which the radially inner portion of slide ring 98 pro- jects and a spring contact 100 is mounted therein for slidable electrical contact with contact ring 98.

Figures 10, 11:
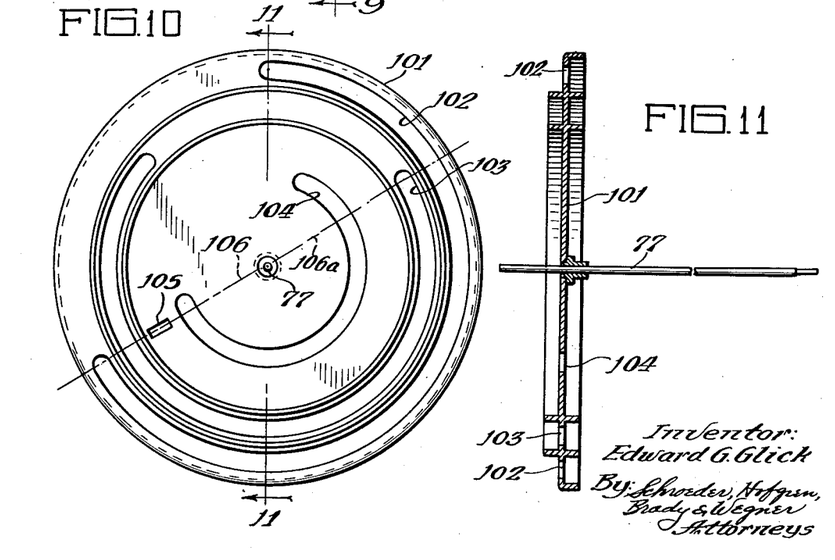
FIG. 10 is a front elevation of the light control disc.
FIG. 11 is a vertical section taken as indicated along the line 11—11 of FIG. 10.

Secured to shaft 77 is a light control disc 101 which extends radially outwardly from the shaft to between the photocells and lamps carried by the revolving frame 84. As best seen in FIGS. 10 and 11, disc 101 is pro- vided with a plurality of arcuate apertures, namely an outer aperture 102, a middle aperture 103, and an inner aperture 104. Between one end of inner aperture 104 and middle aperture 103, the disc is provided with a small opening 105. Outer aperture 102 extends some- what more than 180 degrees from a reference radius 106 in a counterclockwise direction, middle aperture 103 ex- tends in a clockwise direction somewhat more than 180 degrees from a diametrically opposite radius 106a, open- ing 105 is disposed on radius 106 and aperture 104 ex- tends counterclockwise from radius 106 somewhat more than 180 degrees. The radial disposition of aperture 102 is comparable to the radial disposition of lamp 91 and, thus, aperture 102 controls the transmission of light from lamp 91 to photocell 87 depending on the disposition of disc 101. Aperture 103 has a radial disposition com- parable to the radial disposition of lamp 93 and, thus, aperture 103 controls light transmission from lamp 93 to photocell 89. Opening 105 is radially disposed com- parable to the radial disposition of lamp 92 and, thus, opening 105 controls the light transmission from lamp 92 to photocell 88. A grommet 107 is associated with indicator plate 25 to extend through opening 104 and permits the extension of necessary electrical leads there- through to the photocells and spring contact 101 from the rear of the speedometer housing.

THE ELECTRICAL CONTROL MEANS

As indicated above, light control disc 101 controls the transmission of light from lamps 91, 92 and 93 to the corresponding photocells 87, 88 and 89, depending on the rotational position of the disc which, as disc 101 is secured to shaft 77, corresponds to the actual speed of the automobile. Manipulation of knob 20 effects a rotational positioning of frame 84 to vary the disposition of the corresponding pairs of lamps and photocells relative to the reference radius 106. The electrical control 29 is associated with sensing and registering means 26 and with drive 14 to adjust automatically the accelerator pedal to bring the automobile to a selected speed. At the selected speed, disc 101 is rotated to a registered position wherein the apertures of the disc permit illumination of selected photocells and prevent illumination of the remaining photocells. As the lamps and their corresponding photocells may be disposed at different angular distances from the reference radius 106 (herein representing a zero speed of the automobile), this registration of the apertures with the lamps occurs at different automobile speeds. The control circuit providing this functioning is set forth in detail herefollowing.

Figure 20:
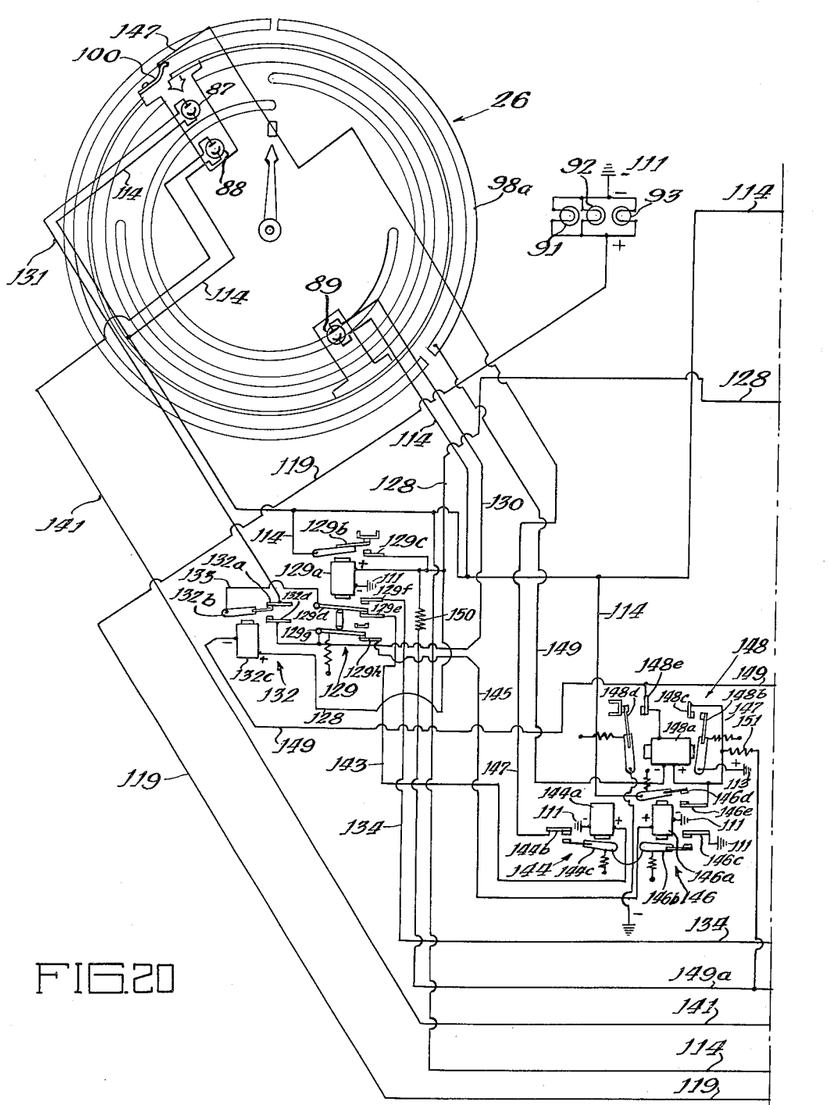
FIG. 20 is the left half of a schematic wiring diagram of the control mechanism circuits.
Figure 20A:
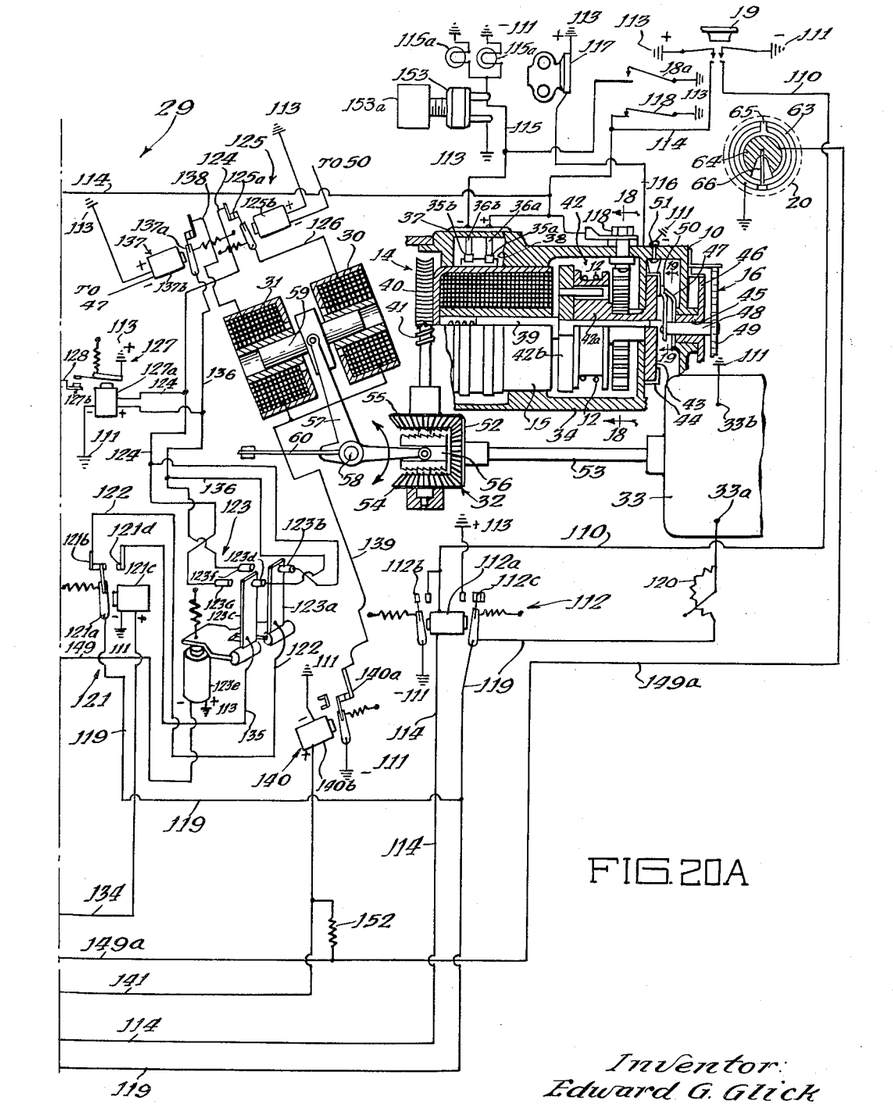
FIG. 20A is the right half of the schematic wiring diagram of the control mechanism circuits.

Reference being had primarily to FIGS. 20 and 20A, which comprise the two halves of the complete schematic wiring diagram, control 29 is seen to comprise a plurality of interconnected relays associated with certain electrical elements of sensing and registering means 26 and holding device 10. A description of the relays and interconnections and the functioning of the control means may be best seen by considering four different operations, as follows:

*Operation No. 1.*—An automatic reduction in the actual car speed to a desired operating speed less than 60 miles an hour slower than the original operating speed;

*Operation No. 2.*—An increase of the actual car speed to a desired speed less than 60 miles an hour faster than the original speed;

*Operation No. 3.*—A reduction of the actual automobile speed to a desired speed more than 60 miles an hour slower than the original speed; and

*Operation No. 4.*—An increase in the actual car speed more than 60 miles an hour faster than the original car speed.

*Operation No. 1*

We will assume that the automobile is travelling at 85 miles per hour under the control of the operator and it is desired to reduce the speed to and maintain it at 50 miles per hour automatically. This is accomplished by turning knob 20 to rotate frame 84 until indicator 84a is set at the 50 mile per hour mark on scale 25a of the indicator plate. This disposes photocell 87 substantially behind the 50 mile per hour mark. The automatic control is turned on by pressing the "On" button 18. The operator then depresses "Automatic" button 19 and removes his foot from the accelerator pedal 11. The pressing of button 19 closes a circuit through lead 110 from the ground or negative battery terminal 111 to a coil 112a of a double pole, single throw relay 112. At the same time, the pressing of button 19 closes a circuit from a positive battery terminal or feed 113 through a lead 114 to feed contact 36a of the holding device thereby applying positive potential through sliding contact 35a to the holding coil 15. The other side of the holding coil connected to contact 35b is connected to ground 111 through contact 36b, lead 115, and the parallel-connected stop lights 115a. The electrical resistance of coil 15 is co-ordinated with the electrical resistance of the stop lights 115a so that the voltage drop across the coil 15 is sufficient to preclude illumination of the stop lights in this series circuit arrangement, even if one stop light should become open circuited.

When coil 15 is thus energized, armature 42b of means 42 is magnetically locked with coil 15. Thus, whatever rotation is imparted to the holding coil by drive means 14 is also transferred to means 42 to which one end of the chain 12 is attached and, depending upon in which direction the drive means rotates, the chain is either wound or released from means 42 to pull accelerator pedal 11 downwardly or release it to move upwardly under the action of spring 13. In the instant operation, we have assumed that the automobile is traveling faster than the desired speed and, thus, the operation of drive means 14 will be rotate holding coil 15 and, thus, means 42 to unwind chain 12 therefrom and allow the pedal to move toward a lower speed setting.

When button 19 is released, the circuit from terminals 111 and 113 therethrough is broken. However, positive potential delivery is continued to lead 114 through a lead 116 connected to the positive terminal 113 through the ignition means 117 of the automobile. Lead 116 delivers positive potential to means 42 from which it is conducted to lead 114 through a terminal 118 associated with means 42. At the same time, relay 112 holds itself in by means of a normaly open contact 112b connecting lead 110 directly to ground 111.

Relay 112 is further provided with a second normally open contact 112c which, when closed by the energization of coil 112a, connects a lead 119 to positive feed 113. Lead 119 is connected through a speed controlling rheostat 120 to one terminal 33a of motor 33, and the other terminal 33b of the motor is connected directly to ground 111 so that whenever relay 112 is energized, motor 33 operates constantly at the speed selected by rheostat 120. Thus, the rapidity with which drive means 14 may drive the holding device to effect a desired change in the setting of pedal 11 may be readily adjusted.

When contact 112c closes, positive potential is also provided through lead 119 to lamps 91, 92 and 93 of the sensing and registering means 26, the circuit through the lamps being completed to ground 111. At the same time, positive potential is delivered from lead 119 through a moving contact 121a of a single pole, double throw relay 121 to a normally closed fixed contact 121b thereof and thence through a lead 122 through a moving contact 123a of a double pole, double throw relay 123, to a normally closed fixed contact 123b thereof, and thence through a lead 124 to a normally closed contact 125a of a single pole, single throw relay 125, and through a lead 126 to one side of solenoid 30. However, before solenoid 30 may operate plunger 59 to pivot crank arm 57 into engagement with bevel gear 54 and effect a rotation of drive 14, holding coil 15 and means 42 to increase, rather than decrease the automobile speed as desired, a correcting circuit is established.

The correcting circuit includes a single pole, single throw relay 127 having a coil 127a connected from lead 124 to ground 111 at the same time that solenoid 30 is energized. The normally open contact 127b thereof is closed when coil 127a is thus energized to connect a lead 128 to the positive feed 113. Lead 128 energizes the coil 129a of a triple pole, double throw relay 129, the other side of which coil is connected to ground 111. A moving contact 129b of relay 129 is closed, when coil 129a is energized, with a normally open contact 129c which is connected to lead 128, the moving contact 129b being connected to lead 114 thereby to complete a holding circuit for relay 129. Also associated with relay 129 is a moving contact 129d which, upon energization of coil 129a, breaks its contact with a fixed normally closed contact 129e and makes a contact with a fixed normally open contact 129f. A third movable contact 129g opens its contact with a fixed normally closed contact 129h at the same time.

Each of photocells 87, 88 and 89 has positive potential applied thereto by lead 114; however, the negative lead 130 from photocell 89 is prevented from delivering potential to contact 129h of relay 129 by the movement of movable contact 129g to the opened position. Lead 131 from the negative side of photocell 87 is connected to a fixed contact 132a of a single pole, double throw relay 132. Contact 132a is normally closed with a movable contact 132b which is connected by lead 133 to movable contact 129d of relay 129. Thus, potential may be delivered from photocell 87 to the now closed contacts 129d—129f of relay 129 and from contact 129f through a lead 134 to the coil 121c of relay 121, the other side of the coil being connected to ground 111 to complete the circuit. Energization of coil 121c causes moving contact 121a of relay 121 to break its contact with fixed contact 121b (thereby disestablishing the circuit to solenoid 30) and makes a contact with normally open fixed contact 121d, thereby delivering potential from lead 119 through contacts 121a—121d, through a lead 135 to a second moving contact 123c of relay 123 which is normally closed with a fixed contact 123d connected to a lead 136 which is connected through a normally closed contact 137a of a single pole, single throw relay 137 to a lead 138 connected to solenoid 31. The ground side of solenoid 31 (and solenoid 30) is connected by a lead 139 through a normally closed contact 140a of a single pole, single throw relay 140 to ground 111 and, thus, completes the circuit to effect energization of solenoid 31. This operates plunger 59 to engage clutch block 56 with bevel gear 55 which effects the desired rotation of drive 14, holding device 15, and means 42 to release chain 12 and permit accelerator pedal 11 to move upwardly and decrease the speed of the automobile to the desired speed, which, in the instant operation, is 50 miles per hour.

Figure 21:
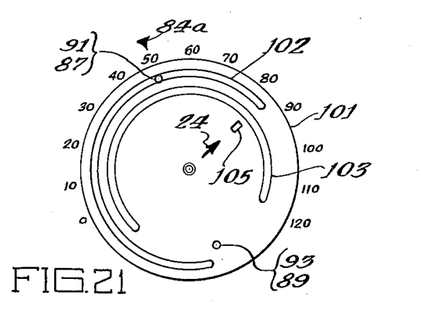
FIG. 21 is a schematic representation of the arrangement of the sensing and registering means and the indicating means when the automobile is travelling at 85 miles per hour and the control is set to effect an automatic operation at 50 miles per hour.
Figure 22:
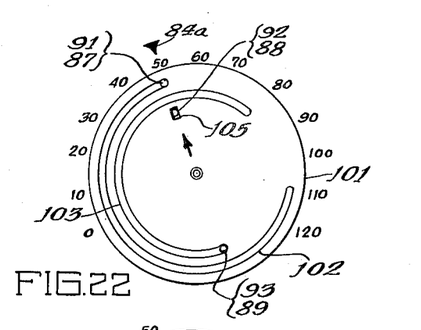
FIG. 22 is a similar schematic representation of the arrangement when the automobile is operating at the selected 50 mile per hour speed.

As described above, to effect the energization of solenoid 31 and thereby move the accelerator pedal to a decreased speed position, it is necessary that current flow through photocell 87 from lead 114 to lead 131. Such current may flow through the photocell only when the photocell is illuminated. As best seen in FIG. 21, photocell 87 is so illuminated when the desired speed, as set by knob 20 and shown by indicator 84a, is 50 miles per hour and the actual speed of the automobile is 85 miles per hour. This is the case because light control disc 101, which is carried by the speedometer shaft, arranges aperture 102 so that lamp 91 illuminates photocell 87. However, as seen in FIG. 22, when the actual speed of the automobile has been reduced to 50 miles per hour, the light control disc 101 will have been rotated in a counterclockwise direction until aperture 102 has moved to just slightly counterclockwise of lamp 91 and, thus, photocell 87 will no longer be illuminated. Thus, potential is no longer delivered through lead 134 to energize coil 121c of relay 121 and the positive potential from lead 119 is now delivered from moving contact 121a of relay 121 to normally closed contact 121b and, thence, through relay 123, lead 124 and relay contacts 125b to solenoid 30 which would reverse the movement of drive 14, resulting in an increase in the actual automobile speed. Such an increase, however, would allow aperture 102 to move slightly clockwise and uncover photocell 87, thereby causing the circuit through contacts 121a—121d to be reestablished whereupon drive 14 is operated to effect a corresponding movement of the accelerator pedal to decrease the actual speed of the automobile. This would result in a constant hunting of the automobile speed about the desired speed.

While such a slight hunting action would not be too serious, control 29 further includes means to maintain the desired speed without such hunting. This is effected through use of the third photocell 88. As best seen in FIG. 2, when the actual speed of the automobile coincides with the desired speed, opening 105 in light control disc 101 is aligned with lamp 92 and photocell 88 whereupon photocell 88 becomes electrically conductive. Positive potential is delivered to photocell 88 from lead 114, and current passes through the photocell to a lead 141 connected to coil 140b of relay 140, the other side of the coil being connected to ground 111. Thus, whenever photocell 88 is illuminated, current is delivered from lead 141 to energize coil 140c which, thereby, opens contact 140a to break the connection of lead 139 with ground 111 and prevent operation of either solenoid 30 or 31. With neither of the solenoids being energized, spring 60 positions clutch block 56 intermediate the bevel gears 55 and 54 and, thus, drive 14 remains stationary precluding the hunting effect discussed above.

Thus, we have automatically reduced the speed of the automobile from an original operating speed of 85 miles per hour to a desired operating speed of 50 miles per hour, at which speed the automobile is automatically maintained until further steps are taken by the operator.

*Operation No. 2*

Figure 23:
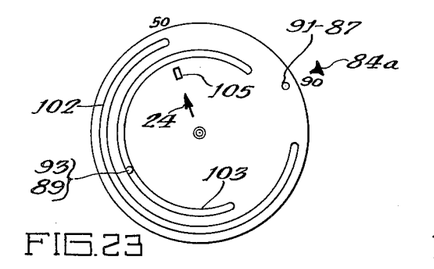
FIG. 23 is a similar schematic representation thereof when the automobile is operating at 50 miles per hour and the selected speed is 90 miles per hour.
Figure 24:
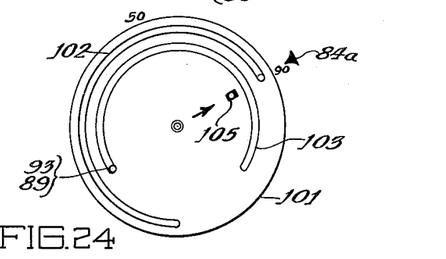
FIG. 24 is a similar schematic representation thereof when the automobile is operating at the selected 90 mile per hour speed.

To illustrate Operation No. 2, we will assume that the automobile is travelling under the actual control of the operator at a present speed of 50 miles per hour and it is desired to increase automatically the speed of the automobile to 90 miles per hour and maintain it at that speed. To effect this, the operator adjusts knob 20 to set indicator 84a at the 90 mile per hour marking on scale 25a. He then depresses "Automatic" button 19 which energizes holding coil 15 and energizes lamps 91, 92 and 93, and motor 33. As seen in FIG. 23, light control disc 101 is arranged so that aperture 103 is aligned with photocell 89 and lamp 93 to permit illumination of the photocell by the lamp, while aperture 102 is displaced angularly from between lamp 91 and photocell 87 whereby disc 101 prevents light transmission therebetween. The functioning of control 29, thus, is similar to the functioning described in Operation No. 1, except that no current is passed through photocell 87. Thus, positive potential from lead 119 is delivered through closed contacts 121a—121b, lead 122, normally closed contacts 123a—121b, lead 124, and normally closed contact 125a to solenoid 30. Plunger 59 is operated to engage clutch block 56 with bevel gear 54 and operate drive 14 to cause chain 12 to pull downwardly on the accelerator pedal 11 and cause an increase in the actual speed of the automobile.

When the actual speed of the automobile becomes 90 miles per hour as desired by the operator, light control disc 101 will have been rotated in a clockwise direction until the clockwise end of aperture 102 is disposed between lamp 91 and photocell 87. However, at the same time, opening 105 is registered with lamp 92 and photocell 88 to effect the maintained speed functioning described in Operation No. 1 and preclude any hunting effect.

*Operation No. 3*

Figure 25:
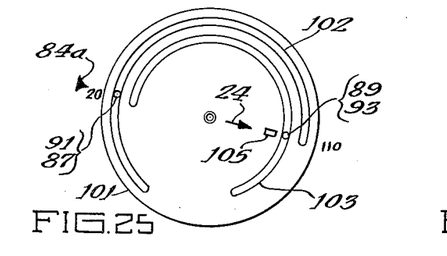
FIG. 25 is a similar schematic representation thereof when the automobile is operating at 110 miles per hour and the selected speed is 20 miles per hour.
Figure 26:
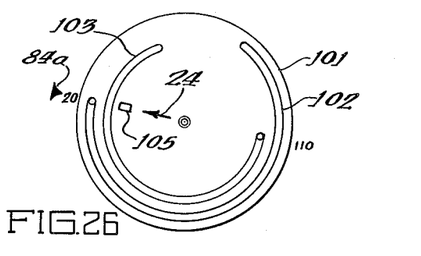
FIG. 26 is a similar schematic representation thereof when the automobile is operating at the selected 20 mile per hour speed.

To illustrate Operation No. 3, we will assume that the car is travelling at an actual speed of 100 miles per hour under the control of the operator and it is desired to decrease automatically the speed to 20 miles per hour and maintain the automobile at that speed. To effect this, the operator turns knob 20 to set the indicator 84a at the 20 mile per hour marking on scale 25a. He then releases the accelerator pedal and depresses button 19. As seen in FIG. 25, the light control disc is arranged at this time so that aperture 102 extends between light 91 and photocell 87 and aperture 103 extends between light 93 and photocell 89 so that each of the photocells is illuminated.

Under these conditions, control 29 functions substantially similarly to its functioning in Operation No. 1. This is true because, while current may pass through photocell 89 in this third operation whereas it could not pass through photocell 89 in the first operation, this does not effect the over-all operation of control 29 as the current delivered from the photocell through lead 130 is interrupted between contacts 129g and 129h of relay 129 which contacts are opened by the energization of coil 129a as described in Operation No. 1. Thus, it is the current which passes through photocell 87 which controls the operation, making Operation No. 3 comparable to Operation No. 1 as solenoid 31 is energized in the same manner to effect the desired repositioning of the accelerator pedal to lower the speed of the automobile to the selected speed.

When the actual automobile speed becomes 20 miles per hour, that speed is accurately maintained by the control effected through photocell 88 as described in Operation No. 1.

*Operation No. 4*

In illustrating Operation No. 4, we will assume that the automobile is operating under the control of the operator at 20 miles per hour and it is desired to automatically increase the speed to and maintain the speed in the upper one-half of the speed range of the automobile, such as at 100 miles per hour. To effect this, the operator turns knob 20 to set indicator 84a at the 100 mile per hour marking, releases the accelerator pedal and depresses button 19.

Figure 27:
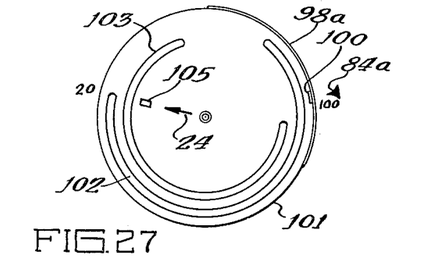
FIG. 27 is a similar schematic representation thereof when the automobile is operating at 20 miles per hour and the selected speed is 100 miles per hour.

Referring to FIG. 27, it will be seen that, as in Operation No. 3, light control disc 101 is arranged so that both photocells 87 and 89 will be illuminated by their respective lamps. However, in this arrangement, as the desired speed is at least 60 miles per hour, spring contact 100 is in electrical contact with portion 98a of the split ring 98 (which extends clockwise from an end aligned with the 60 mile per hour mark of scale 24a). As will be pointed out more clearly here following, this causes a reversed functioning of the control 29 from the functioning of Operations No. 2.

As photocell 87 is illuminated, current may flow from lead 114 through the photocell to lead 131, through closed contacts 132a—132b of relay 132, through lead 133, through closed contacts 129d—129e of relay 129 through a lead 143 to a coil 144a of a single pole, single throw relay 144, the other side of coil 144a being connected to ground 111. At the same time, current may flow through illuminated photocell 89 from lead 114, through lead 130, through closed contacts 129g—129h of relay 129, through a lead 145 to a coil 146a of a single pole, single throw relay 146, the other side of coil 146a being connected to ground 111. A lead 147 connects spring contact 100 to a fixed contact 144b of relay 144 which is closed with the movable contact 144c by the energization of coil 144a. Movable contact 144c is, in turn, connected to a movable contact 146b of relay 146 which is closed with a fixed contact 146c by the energization of coil 146a thereof. Fixed contact 146c is connected to ground 111, thus completing the connection of spring contact 100 to ground. As spring contact 100 is in contact with segment 98a of the slide ring under this operating condition (FIG. 27), segment 98a is similarly grounded.

Energization of coil 146a of relay 146 also closes a movable contact 146d which is connected to positive lead 114 with a fixed contact 146e connected to a lead 147. Lead 147 is connected to one side of a coil 148a of a double pole, single throw relay 148, the other side of which coil is connected by a lead 149 to ring segment 98a, thereby connecting the coil to ground. When coil 148a is energized, it closes a moving contact 148b connected to positive feed 113 with a normally open fixed contact 148c connected to lead 147, thereby establishing a holding circuit maintaining the positive potential feed to coil 148a. At the same time a holding circuit is established maintaining the ground connection to the other side of coil 148a, this holding circuit comprises a moving contact 148d connected to ground 111 and closed with a fixed contact 148e connected to the ground side of the coil 148a.

Contact 148e is also connected to a lead 149 which is connected to one side of coil 123e of relay 123, the other side of the coil being connected to the positive lead 113 to complete the circuit through the coil. Energization of coil 123e causes moving contact 123a to break its contact with fixed contact 123b and, instead, to have connection with a normally open fixed contact 123f, and moving contacts 123c to break its contact with fixed contact 123b and, instead, makes a contact with a normally open fixed contact 123g. Fixed contact 123f is connected to lead 136 and fixed contact 123c is connected to lead 124; thus, the energization of coil 123e reverses the connections from leads 122 and 135 to the solenoids 30 and 31, respectively.

Positive potential is applied to coil 127a of relay 127 through closed contacts 121a—121b of relay 121, lead 122, closed contacts 123a—123f and lead 136. Energization of coil 127a closes contact 127b, applying positive potential to coil 129a of relay 129 through lead 128. Energization of coil 129a closes contacts 129b—129c to establish the previously described holding circuit for relay 129. At the same time, contact 129d—129e is broken thereby interrupting the positive potential feed to coil 144a of relay 144. When contacts 148d—148e of relay 148 closed, coil 132c of relay 132 was connected to ground through lead 149, the other side of the coil 132c being connected to lead 128, thereby energizing coil 132c and closing moving contact 132b with fixed contact 132d of the relay. Thus, current from photocell 89 may now flow through lead 130, closed contacts 132d—132b, lead 133, closed contacts 129d—129f of relay 129, and through lead 134 to coil 121c of relay 121. This energizes coil 121c and connects movable contact 121a with fixed contact 121d, thereby sending current from lead 119 to lead 135 rather than to lead 122 as when the relay coil 121c is not energized. Thus, the positive potential is now delivered through closed contacts 123c—123g to lead 124 so that the proper solenoid, solenoid 30, is energized to effect the desired increase in the actual speed of the automobile.

Figure 28:
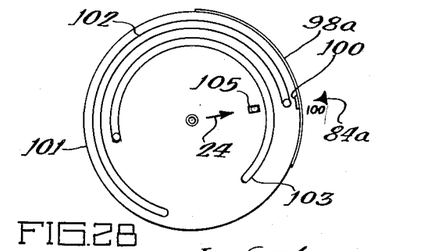
FIG. 28 is a similar schematic representation thereof when the automobile is operating at the selected 100 mile per hour speed.

When the actual speed of the automobile reaches the desired 100 mile per hour speed, as best seen in FIG. 28, aperture 103 will have moved in a clockwise direction until the counterclockwise end of the aperture 103 is aligned with the photocell 89. Thus, any further increase in the automobile speed will cause the light control disc 101 to block passage of light from lamp 93 to photocell 89, which would prevent delivery of current through the photocell, resulting in a de-energization of relay coil 121c, whereupon moving contact 121a would be returned to closed relationship with fixed contact 121b to connect the positive potential from lead 119 to lead 122 and effect a resultant energization of solenoid 31 resulting in a movement of the accelerator pedal, tending to slow the automobile down to the desired speed. Again, however, photocell 88 is operative to maintain the automobile speed substantially at the desired speed without such hunting, by disconnecting both of the solenoid coils as long as the automobile speed is in substantial accordance with the selected speed.

AUXILIARY FEATURES OF THE CONTROL

In each of the above described operations, it was assumed that the operator was operating the automobile in a conventional manner, utilizing the accelerator pedal and that he effected a change from the conventional operation to the automatic operation provided by accelerator control. It is possible, however, also to adjust the desired speed of the automobile at any time while the automobile is being operated automatically by the control. This is accomplished simply by resetting knob 20 to the new desired speed of operation. However, during the time in which the operator is adjusting the knob, it is desirable to inactivate the control so that when the new selected speed is set by the knob, the circuit may respond in the same manner as described in the four operations discussed above, depending upon which of the four relationships of actual automobile speed to the new selected speed is established.

To illustrate this functioning, we will assume that the automobile is being operated automatically by the control at a speed of 50 miles an hour and that the operator desires to change the speed automatically to 40 miles per hour. All that the operator need do is to rotate knob 20 until indicator 84a is newly positioned at the 40 mile per hour marking on scale 25a. During the time that knob 20 is being rotated, projection 65 of arm 64 engages split ring 63, being allowed to do so by the yielding action of spring 66. As ring 63 is grounded, lead 149a connected to arm 64 is connected to ground. When the operator has properly adjusted knob 20 and releases the knob, spring 66 causes projection 65 to center itself between the two portions of split ring 63, thus breaking this connection to ground. During the time that the ground connection is established, each of relays 129 and 148 is de-energized. This is effected by connecting a bypass resistor 150 between lead 149a and the positive potential lead 128 feeding relay coil 129a to de-energize 129, and connecting a bypass resistor 151 between lead 149a and the positive potential lead 147 feeding coil 148a to de-energize relay 148. At the same time, it is desired to energize relay 140 and thereby open contacts 140a—140b to preclude any operation of the solenoids 30 and 31 during the setting operation of knob 20. This is accomplished by connecting a resistor 152 between lead 149a and the positive potential lead 141 of relay coil 140c.

Thus, when knob 20 is released, control 29 causes the actual automobile speed to be reduced from the original 50 miles per hour automatically to the newly selected speed of 40 miles per hour, effecting this automatic change in the same manner as described relative to Operation No. 1 above. By temporarily de-energizing the two key relays 129 and 148, control 29 must reappraise the difference between the actual operating speed and the newly selected speed and cause the automatic control to function correspondingly. Resultingly, should the difference between the original actual speed and the new desired speed be such as would require alternatively Operations No. 2, No. 3 or No. 4, instead of Operation No. 1, as described above, control 29 would automatically establish this and effect the necessary operation.

As alluded to briefly above, the automatic control of the instant invention includes a means 16 which limits the operation of the holding device to preclude attempting to urge the accelerator pedal beyond its normal limit. Thus, for example, if the automobile were ascending a hill having a slope such that the automobile engine is incapable of driving the automobile up the hill at the desired speed, the automatic control, without means 16, would tend to continue to pull down on the accelerator pedal which would either break the chain or the mechanism. To preclude this, means 16 is arranged to de-energize relay 125, which controls solenoid 30, and prevent further pulling of accelerator pedal 11 after it reaches a predetermined limit. Conversely, if the automobile is descending a hill which permits the automobile to overrun the speed setting, the holding device might allow the accelerator pedal to rise to the idling position which actuates means 42 to break the holding connection effected from lead 116 and restore the automobile to conventional control. This is undesirable and, thus, means 16 is arranged to de-energize relay 137 before the accelerator pedal reaches the full idling position, thereby precluding further operation of solenoid 31 to release the accelerator pedal.

More specifically, brush 51 is connected to ground 111, thereby maintaining ring 44 at ground potential. Contact arm 50 is adjusted by means of handwheel 49 so that when means 42 has rotated sufficiently to pull the accelerator pedal to just short of its maximum setting projection 44b of ring 44 contacts arm 50 which is connected to the negative side of coil 125b of relay 125, thereby completing the circuit through the relay coil from positive lead 113 to open the contact 125a. Contact arm 47 is adjusted by means of handwheel 46 to engage projection 44a on ring 44 just before the full idle position of accelerator pedal 11 is reached. Arm 47 is connected to the negative side of coil 137c of relay 137 and, thus, completes the circuit through the coil to positive lead 113 opening contacts 137a—137b and precluding further operation of solenoid 31.

As soon as the automobile speed changes so that there is no further tendency for the control to over-operate the accelerator pedal, means 16 automatically becomes inoperative and the control is restored to the normal controlling operation as described above.

When it is desired to remove the automobile from automatic control to conventional control, this may be effected by brake actuated switch 153 which, when operated, applies positive potential to lead 115, by turning off the ignition switch 117 which breaks the holding circuit through lead 116, by operating the accelerator pedal to affect means 42 as described in Patent 2,822,902, or by depressing the "Off" button 18a which also applies a positive potential to lead 115. It should be noted that the series connection of holding coil 15 with stop lights 115a eliminates the need for a neutralizing coil as disclosed in Patent 2,822,902 or an additional control relay as disclosed in my prior Patent 2,270,002. Thus, either "Off" button 18a or brake switch 153 may merely short out coil 15 to effect desired de-energization thereof.

The foregoing detailed description is given for clearness of understanding only and no unnecessary limitations are to be understood therefrom, as some modifications will be obvious to those skilled in the art.

I claim:
1. Means for automatically bringing an automobile to a selected speed and maintaining that speed, as desired by an operator, comprising; drive mechanism for moving the accelerator pedal of the automobile; means sensing the actual speed of the automobile; means adjustable by the operator to a selected speed; a source of illumination; and actuating means responsive to a difference between the actual automobile speed and the selected speed of said adjustable means to drive said mechanism and thereby move the accelerator to eliminate such difference, said last named means including a pair of elements one of which is operative when the actual automobile speed is greater than the selected speed and the other of which is operative when the actual automobile speed is less than the selected speed, said elements being photoelectric, the means sensing the speed of the automobile including light control means alternatively precluding and effecting illumination of said elements by said source to effect the operation of said mechanism.

2. The device of claim 1 wherein the control means includes means for effecting operation of said mechanism to move the accelerator to lower the actual speed of the automobile when said photoelectric elements are concurrently illuminated and the actual speed of the automobile is greater than the selected speed.

3. The device of claim 2 wherein the control means includes means for effecting operation of said mechanism to move the accelerator to increase the actual speed of the automobile when said photoelectric elements are concurrently illuminated and the actual speed of the automobile is less than the selected speed.

4. The device of claim 3 wherein said last named means is operative whenever the selected speed is in the upper half of the total speed range of the automobile.

5. Means for automatically bringing an automobile to a selected speed and maintaining that speed, as desired by an operator, comprising: drive mechanism for moving the accelerator pedal of the automobile; means sensing the actual speed of the automobile; means adjustable by the operator to a selected speed; activating means responsive to a difference between the actual automobile speed and the speed of said adjustable means to drive said mechanism and, thereby move the accelerator to eliminate such difference; and means temporarily disabling the means for driving said mechanism whenever the adjustable means is being adjusted by the operator.

6. The device of claim 5 wherein the disabling means includes a spring contact associated with the adjustable means.

7. In a mechanism for controlling the speed regulating means of a variable speed device, a control means comprising: a first sensing element; a second sensing element; a movable carrier supporting said sensing elements at a fixed distance from each other; a member movable adjacent said carrier to have variable displacement from a reference, as desired, which displacement corresponds to the speed of the variable speed device, said member having a first control element for actuating the first sensing element, said first element extending from a first point on the member a distance less than the spacing between said sensing elements, and a second control element for actuating the second sensing element, said second element extending toward said first point from a second point on the member a distance less than the spacing between said sensing elements, the spacing between said points being equal to the spacing between said sensing elements; and means responsive to the actuation of the sensing elements by the control elements to cause the speed of the device to be such that the resultant movement of said member relative to said reference tends to align said first point with the first sensing element and the second point with the second sensing element.

8. In a mechanism for controlling the speed regulating means of a variable speed device, a control means comprising: a first sensing element; a second sensing element; a carrier having a pivotal axis and supporting said sensing elements diametrically opposite each other; a member pivotable about said axis to have variable angular displacement from a reference, as desired, which displacement corresponds to the speed of the variable speed device, said member having a first control element for operating the first sensing element, said first element extending from a first radius circumferentially about said axis less than 180°, and a second control element for operating the second sensing element, said second element extending from an opposite radius circumferentially about said axis less than 180° and toward said first radius in a direction opposite to the extension of the first control element from the first radius; and means responsive to the operation of the sensing elements by the control elements to cause the speed of the device to be such that the resultant pivoting of said member about said axis tends to align said first radius with the first sensing element and the opposite radius with the second sensing element.

9. In a mechanism for controlling the speed regulating means of a variable speed device, a control means comprising: a first photoelectric sensing element; a second photoelectric sensing element; a source of light disposed for illumination of said elements; a carrier having a pivotal axis and supporting said sensing elements diametrically opposite each other; a member pivotable about said axis to have variable angular displacement from a reference, as desired, which displacement corresponds to the speed of the variable speed device, said member having a first curtain element for blocking light from said source to the first sensing element and extending from a first radius circumferentially about said axis less than 180°, and a second curtain element for blocking light from said source to the second sensing element and extending from an opposite radius circumferentially about said axis less than 180° and toward said first radius in a direction opposite to the extension of the first curtain element from the first radius; and means responsive to the blocking of light to the sensing elements by the curtain elements to cause the speed of the device to be such that the resultant pivoting of said member about said axis tends to align said first radial line with the first sensing element and the second radial line with the second sensing element.

10. In a mechanism for controlling the speed regulating means of a variable speed device, a control comprising: a first sensing element; a second sensing element; a carrier having a pivotal axis and supporting said sensing elements diametrically opposite each other; a member pivotable about said axis to have variable angular displacement from a reference, as desired, which displacement corresponds to the speed of the variable speed device, said member having a first control element for operating the first sensing element, said first element extending from a first radius circumferentially about said axis less than 180°, and a second control element for operating the second sensing element, said second element extending from an opposite radius circumferentially about said axis less than 180° and toward said first radius in a direction opposite to the extension of the first control element from the first radius; and means responsive to the operation of the sensing elements by the control elements to cause the speed of the device to be such that the resultant pivoting of said member about said axis tends to align said first radius with the first sensing element and the opposite radius with the second sensing element, said means including a switching mechanism operative when said member is pivoted to a predetermined range of positions to reverse the action of said means which would otherwise be effected in response to the operation of the sensing elements.

11. In a mechanism for controlling the accelerator means of an automobile having a brake actuated switch, control means comprising: a pair of electric power source terminals; holding means operable when electrically energized to permit desired control of the accelerator means; a stop light in electrical series relationship with said holding means effecting connection thereof to one power source terminal; means connecting the holding means to the other power source terminal, the electrical characteristics of the holding means being such that the stop light is unilluminated when connected in such series relationship with the holding means; and a brake actuated switch in electrical parallel relationship with said holding means to short circuit said holding means and illuminate the stop light by connecting it to the other power source terminal whenever said brake switch is closed.

12. In a mechanism for controlling the speed regulating means of a variable speed device, control means comprising: a pair of electric power source terminals; holding means operable when electrically energized to permit desired control of the speed regulating means; electrically operable means in electrical series relationship with said holding means effecting connection thereof to one power source terminal; means connecting the holding means to an other power source terminal; and switch means in electrical parallel relationship with said holding means to selectively short circuit said holding means and connect said electrically operable means to the other power source terminal.

13. The control means of claim 12 wherein the switch means is manually operable.

14. The control means of claim 12 wherein the switch means comprises a brake switch automatically operated when the variable speed device is braked.

15. In a mechanism for controlling the speed regulating means of a variable speed device, control means comprising: a pair of electric power terminals having a desired voltage thereon; holding means operable when electrically energized to permit desired control of the speed regulating means; electrically operable means in electrical series relationship with said holding means effecting connection thereof to one power source terminal; means connecting the holding means to an other power source terminal, said electrically operable means being inoperative by the voltage thereacross when in such series relationship with the holding means; and switch means in electrical parallel relationship with said holding means to selectively short circuit said holding means and connect said electrically operable means to said power source terminal to concurrently de-energize the holding means and initiate operation of the electrically operable means.

References Cited in the file of this patent

UNITED STATES PATENTS

| | | |
|---|---|---|
| 2,127,454 | Wolfe et al. | Aug. 16, 1938 |
| 2,164,114 | Kolb | June 27, 1939 |
| 2,311,142 | Turrettini | Feb. 16, 1943 |
| 2,624,247 | Claff et al. | Jan. 6, 1953 |
| 2,661,071 | Hoener | Dec. 1, 1953 |
| 2,671,542 | Robnett | Mar. 9, 1954 |
| 2,822,881 | Trehorne | Feb. 11, 1958 |
| 2,822,882 | Campbell | Feb. 11, 1958 |
| 2,912,058 | Sandor | Nov. 10, 1959 |